April 11, 1961    H. W. ROEBER    2,979,084
WIRE SPREADING MACHINE
Filed Nov. 23, 1955    6 Sheets-Sheet 5
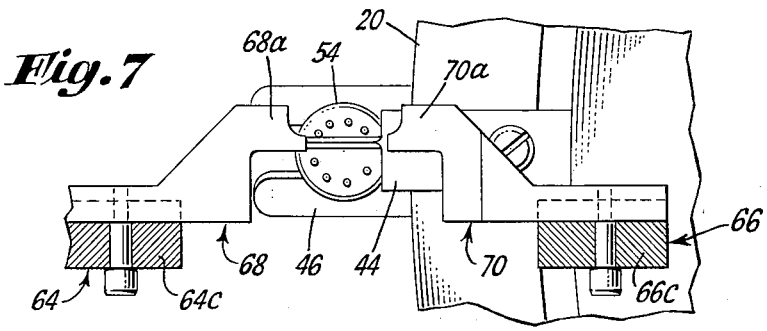
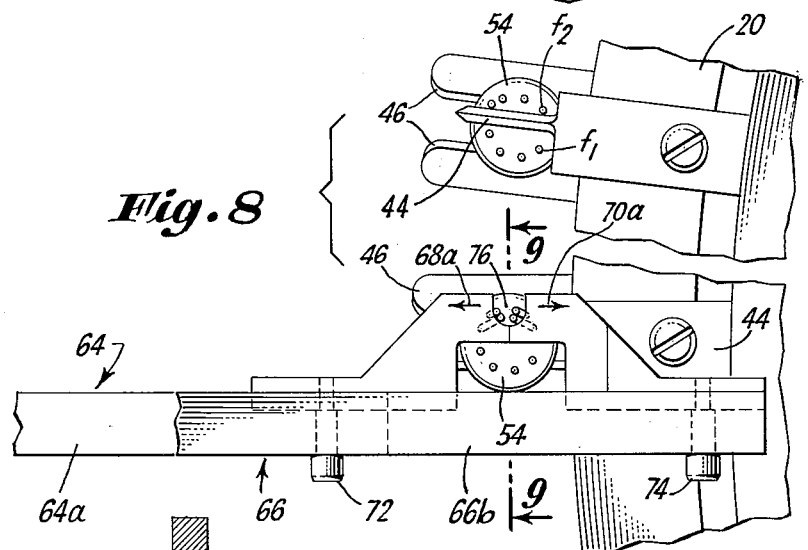
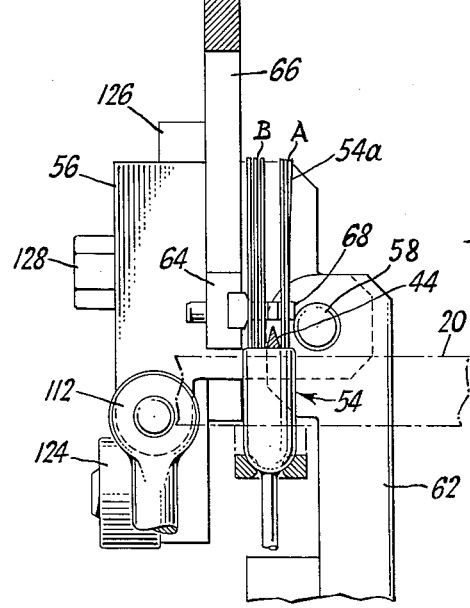
INVENTOR
HENRY W. ROEBER
BY
Michael Hertz
ATTORNEY April 11, 1961  H. W. ROEBER  2,979,084
WIRE SPREADING MACHINE
Filed Nov. 23, 1955  6 Sheets-Sheet 6

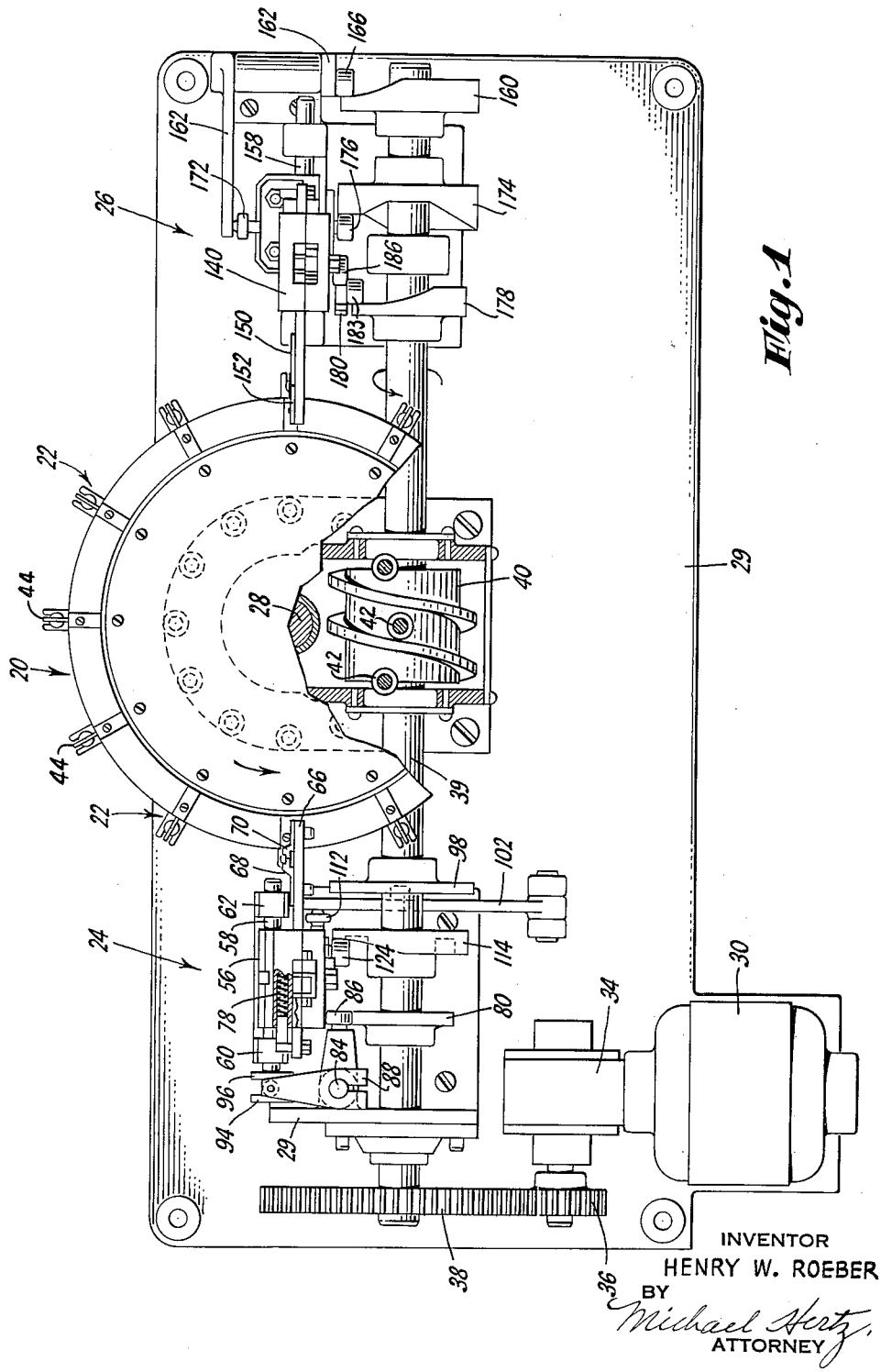

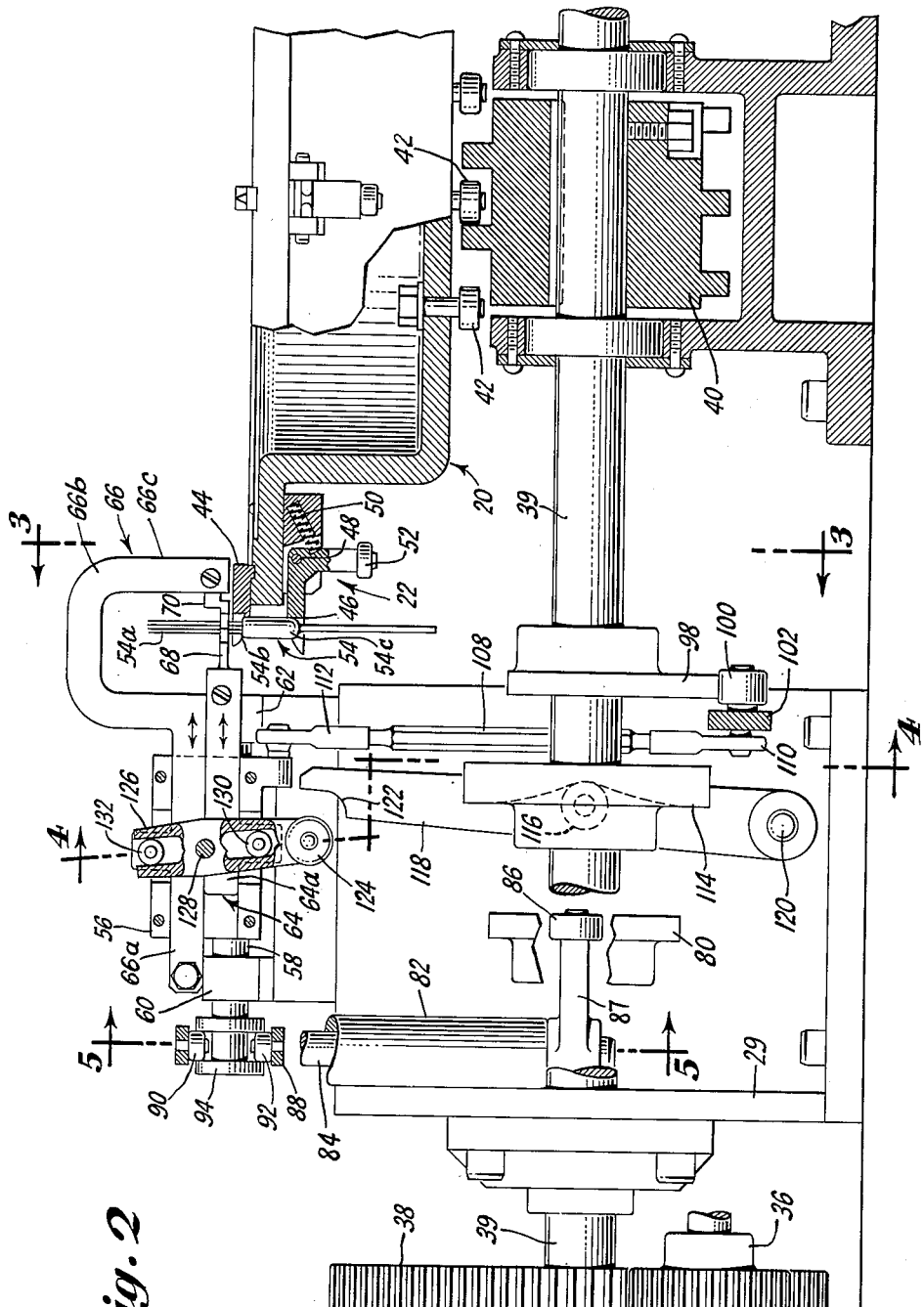

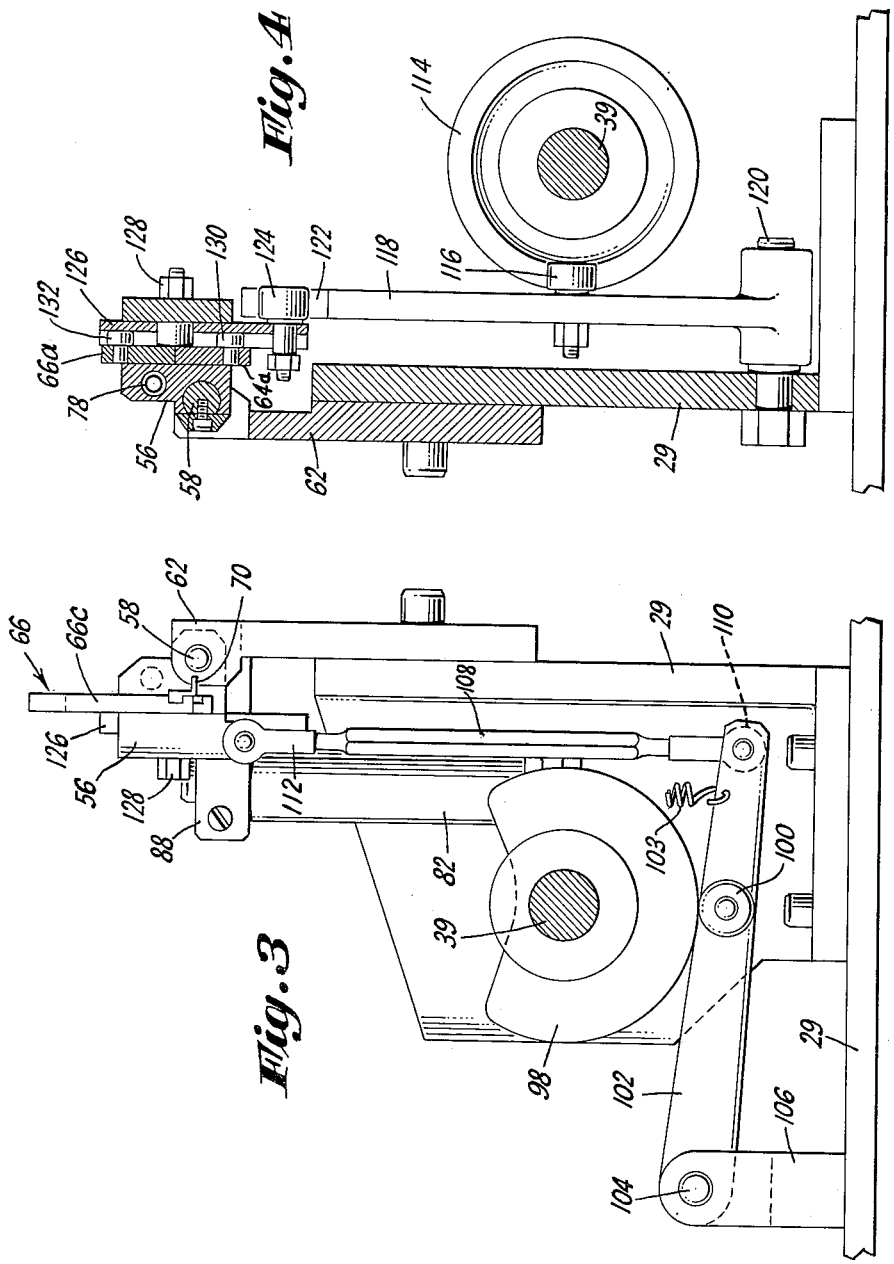

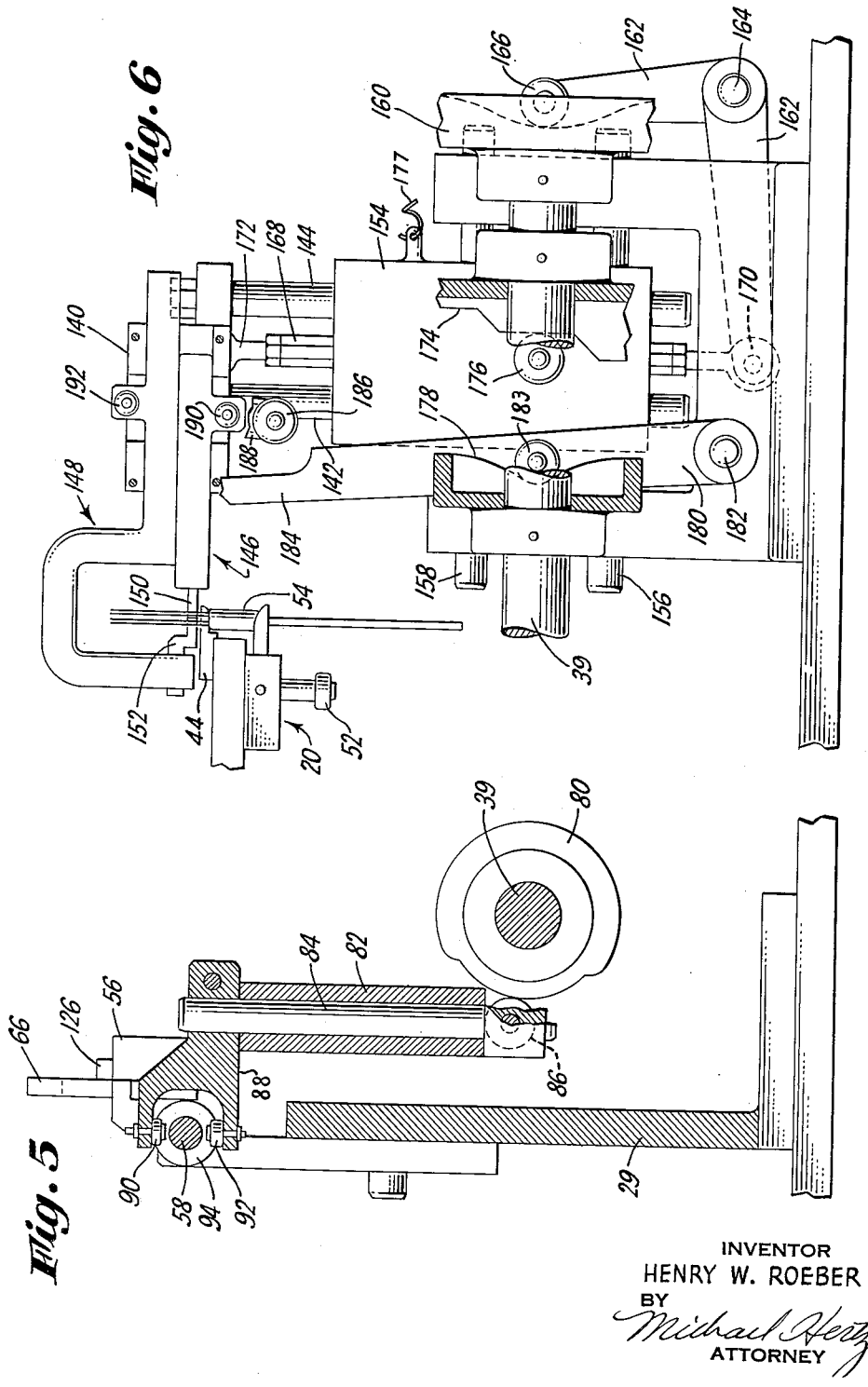

INVENTOR
HENRY W. ROEBER
BY
Michael Hertz
ATTORNEY

United States Patent Office 2,979,084
Patented Apr. 11, 1961

2,979,084

WIRE SPREADING MACHINE

Henry W. Roeber, Emporium, Pa., assignor, by mesne assignments, to Sylvania Electric Products Inc., Wilmington, Del., a corporation of Delaware Filed Nov. 23, 1955, Ser. No. 548,629

16 Claims. (Cl. 140—71.6)

The present invention relates to an automatic device and process for working wires, such as the leads of thermionic devices, and particularly to a machine and method for grouping, bunching, orienting, straightening, and stretching the leads of vacuum tubes.

In the manufacture of various electrical devices having projecting leads or wires, it is often advantageous or necessary to position one or more of the leads preliminary to further processing or testing of the device. Separate and apart from the substantial advantages derived by having properly positioned leads, it may be feasible to utilize the oriented leads for other purposes, for example, to initiate operation of ancillary equipment.

Illustrative of the many practical needs for oriented wires is the grouping and positioning of the leads of a vacuum tube as an incident to processing the cathode coating of the tube. Briefly, in indirectly heated tubes, the cathode sleeve of the vacuum tube is coated with triple carbonates which are broken down under heat druing exhaust thereof on a bulb sealing machine to obtain a thermionic emissive substance. Breakdown is effected by applying a voltage to the filament or heater leads in excess of the normal voltage to be applied to the filament to raise the cathode temperature above the normal operating temperature. The abnormal temperature condition drives off the oxygen from the carbonates, generally as CO and $CO_2$ which are carried away as part of the exhausted gases. In the past the breakdown potential was applied to the leads by manually spreading the leads into two separate groups each including one cathode or heater lead, and thereafter feeding the vacuum tube to a sealing machine with the grouped leads properly positioned to engage track contacts. These contacts are connected to a suitable source of electrical potential, exhaust of the tube being accomplished simultaneously in accordance with previous techniques. Difficulties have been encountered in preparing the cathode leads for electrical connection to the track contacts of the machine, especially since the leads heretofore have been manually separated, grouped and oriented. This manual operation seriously bottlenecked sequential processing of the vacuum tubes at the relative high production speeds which is possible of attainment during other stages of manufacture with the sealing machine. The problem is even more pronounced when processing miniature and subminiature tubes since even highly skilled operators find it difficult, tedious, and time-consuming to work the relatively small and fragile leads of such tubes to obtain the desired grouping and orienting.

Accordingly, it is an object of the present invention to provide a novel wire-positioning machine obivating the aforesaid difficulties.

Another object of the present invention is the provision of automatic mechanisms capable of orienting groups of wires. In particular, it is a further object of the invention to angularly position one or more relatively fragile leads of a vacuum tube relative to other leads of the tube.

It is a still further object of the present invention to provide a novel machine and method for positioning relatively fragile wires, such as the leads of miniature vacuum tubes, without breaking or kinking the wires. Specificaly, it is within the contemplation of the present invention to bunch and orient one group of leads of a vacuum tube relative to another group of leads and to bunch, straighten, and stretch the last named group, thereby preparing the vacuum tube for further processing.

A still further object of the present invention is the provision of automatic mechanism capable of bunching and orienting lead wires of vacuum tubes in order to facilitate routine and orderly manufacture of the vacuum tubes at relatively high production speeds.

The above objects and further advantages of the present invention will be best understood by reference to the following detailed description of an illustrative embodiment when taken in conjunction with the drawings, wherein:

Fig. 1 is a top plan view, with parts broken away and shown in section, of a preferred embodiment of the lead grouping and orienting machine;

Fig. 2 is an enlarged fragmentary elevational view of the machine of Fig. 1, particularly showing the details of a first lead working station;

Fig. 3 is an elevational view taken along the line 3—3 of Fig. 2 and looking in the direction of the arrows;

Fig. 4 is a sectional view taken along the line 4—4 of Fig. 2 and looking in the direction of the arrows;

Fig. 5 is a sectional view taken along the lines 5—5 of Fig. 2 and looking in the direction of the arrows;

Fig. 6 is an elevational view, with parts broken away and in section, showing details of a second lead working station;

Fig. 7 is an enlarged fragmentary plan view showing details of holders for supporting vacuum tubes on a main turret in position to be engaged by the lead working jaws of the first station, the lead-working jaws being illustrated in an open or sperad position;

Fig. 8 is a fragmentary plan view similar to Fig. 7 but showing the lead-working jaws in the normally closed or work position;

Fig. 9 is a fragmentary sectional view taken along the line 9—9 of Fig. 8, showing the vacuum tube held in position preparatory to spreading of the tube leads;

Figure 11:
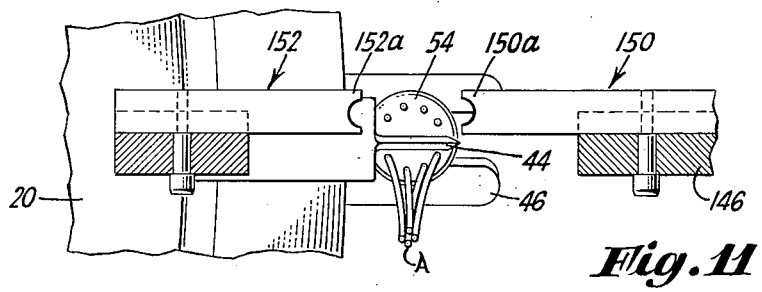
Fig. 11 is a fragmentary plan view showing the vacuum tube after processing through the first lead working station and supported in position to be engaged by jaws of a second lead working station which are shown in the open or spread position.

Referring now particularly to the drawings, there is shown a wire working machine which is suitable for bunching, orienting, straightening and stretching the wires of electrical devices, such as the leads of vacuum tubes. The wire working machine includes a main turret or feed carrier 20 having a plurality of peripherally spaced tube holders 22 each of which is adapted to support a vacuum tube in an inverted position, i.e., with bulb down and leads up, for sequential processing through a first lead-working station 24 to the left of Fig. 1, and a second lead-working station 26, to the right of Fig. 1.

The turret or carrier 20 is supported on a main shaft 28 journaled in a frame 29 and is periodically indexed in a counterclockwise direction to bring successive tubes supported in the holders 22 into work positions relative to the first and second lead-working stations 24 and 26. The turret 20 is driven from a drive motor 30 which is coupled via a gear-reduction box 34, pinion 36 and driven gear 38 to main cam shaft 39. The cam shaft 39 carries an indexing barrel cam 40 provided with suitable cam tracks receiving roller followers 42, arranged circumferentially on the under surface of turret 20. Upon energization of the motor 30, the indexing mechanism is effective to move the turret 20 through an arc equal to the peripheral spacing of the respective tube holders 22.

Figure 10:
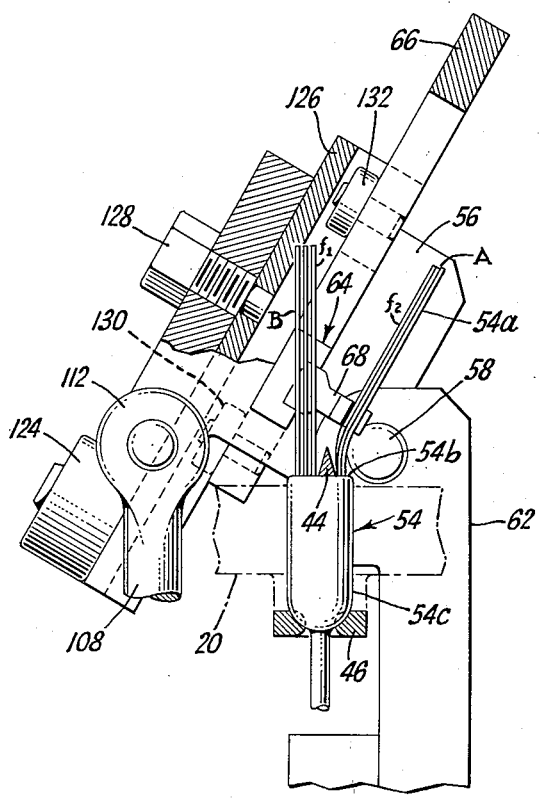
Fig. 10 is a view similar to Fig. 9 showing oriented and grouped leads subsequent to the lead-spreading operation.

Each of the holders 22, as best seen in Figs. 2 and 9 and 10, includes an upper stop in the form of a radially extending wedge-shaped lead-parting member 44 and a lower stop in the form of a tube-seating forked member 46 which is pivotally mounted on the underside of the turret 20 by a horizontal pin 48. The seating member 46 is biased into a horizontal position beneath the member or wedge 44 by a spring 50 which bears against a depending operating member 52. Any suitable mechanism may be provided for periodically pivoting the tube-seating member 46 out of the horizontal position and away from the wedge 44 to permit release of a supported vacuum tube, generally designated by the reference numeral 54. The tube 54 is arranged with its leads 54a projecting upwardly from the tube base 54b and spread on opposite sides of the wedge 44. Support of the tube is effected by the wedge 44 which abuts the tube base 54b, and the seating member 46 which is shaped to be engaged about the end of the tube body 54c remote from the base 54b. Accordingly, the turret 20 can be manually loaded with tubes 54 having the leads 54a arranged in two groups separated by the parting wedge 44. Thereupon, the turret can be indexed to bring the tubes 54 to the first work station 24, which operates to bunch one group of leads designated by the letter A and to angularly position the bunched group of leads relative to the other group of leads designated by the letter B. Further indexing of the turret brings the vacuum tubes to the second work station 26 which is constructed to bunch and straighten the other group of leads B. The first and second work stations 24 and 26 will now be described in detail.

Referring now particularly to Figs. 1 to 5, 9 and 10, the first work station 24 will be seen to include a head 56 which is keyed to a shaft 58 rockably mounted in bearings 60, 62, see Fig. 1, shaft 58 being longitudinally slidable within the bearings 60, 62 for reciprocating movement radially of the turret 20. Slidably supported on the head 56, see Fig. 2, are a first tool holder 64 and a cooperating second tool holder 66. The first tool holder 64 includes an arm 64a arranged beneath a corresponding arm 66a of the cooperating tool holder 66, which additionally includes an inverted U-shaped arm 66b having a depending leg 66c spaced inwardly from the adjacent free end of the first tool holder 64. Holders 64, 66 adjustably carry lead-working tools 68 and 70 which are movable toward and away from each other in response to opposite reciprocatory movement of the tool holders relative to each other.

In Figs. 7 and 8 there are shown the details of the lead working tools 68 and 70 which are detachably supported on the reciprocating tool holders 64 and 66. The lead working tools 68 and 70 include cooperating jaws 68a, 70a, which are cut away inwardly from one side to provide a pocket 76 for receiving the leads to be bunched and bent through a predetermined arc. The jaws 68a and 70a are biased into the closed position illustrated in Fig. 8 by a spring 78, Fig. 1, which is operatively connected to the holders 64 and 66. The tools 68 and 70 are adapted to receive the leads 54a and, as the head 56 is moved back and forth along the axis of the radially extending shaft 58, effect a bunching and straightening of the leads in the region of the tube base 54b. Further, when the head 56 is rocked in the clock-wise direction along the axis of shaft 58, as viewed in Fig. 9, the tools 68 and 70 angularly position the bunched leads A relative to the remaining leads B.

While the wires of a group are urged together by the bias of spring 78 imposed on tools 68 and 70, back and forth movement is imparted to the head-supporting shaft 58 from the head-reciprocating cam 80 supported on the cam shaft 39. As best seen in Figs. 1, 2, and 5, the cam shaft 39 is coupled to the head 56 by the provision of a stationary sleeve bearing 82 on the frame 29 supporting an actuating shaft 84 which is rocked back and forth by the cam follower 86. The follower is supported on a horizontal crank 87 connected to the adjacent end of the actuating shaft 84. The limited rotary movement of the actuating shaft 84, under control of cam 80, is imparted to the head 56 by means of a bifurcated follower support 88 which is keyed to the other end of the actuating shaft 84 and carries rollers 90, 92 riding between circular stop collars 94, 96 on the adjacent end of shaft 58. The stop collars 94, 96 cooperate with the rollers 90 and 92 to couple the actuating shaft 82 to the head supporting shaft 58 in a manner permitting the latter to be rocked within the bearings 60, 62, yet assuring the transmittal of the requisite back and forth movement to the shaft 58 from cam 80.

Following the bunching of the leads in response to the back and forth movement of the head 56, the leads of the bunched group A are angularly bent with respect to the remaining leads by rocking the head through a predetermined arc and into an inclined position, as illustrated in Fig. 10. Rocking movement is imparted to the head 56 from a head rocking cam 98 supported on the cam shaft 39. As clearly seen in Figs. 2 and 3, the cam 98 is coupled to the head 56 through a cam follower 100 which is journalled on an arm 102. The arm 102 is pivoted adjacent one extremity by pin 104 on a bracket 106 of the main frame 29, the follower 100 being biased against cam 98 by a spring 103 connected to arm 102. The other extremity of the follower-supporting arm 102 as coupled to the lower end of a vertically-extending two part spring pressed together expansible connecting rod 108 of known construction, by a universal or ball joint 110. The upper end of the expansible rod 108 is coupled via a further universal or ball joint 112 to the head 56. The utilization of the expansible coupling rod 108 permits the desired rocking movement of the head 56 under control of cam 98, yet allows the head 56 to be moved back and forth, as previously described.

Subsequent to the bunching and orienting of the leads in response to the sequential reciprocating and rocking movement of head 56, it is necessary to spread the tools 68 and 70 from the normally closed position of Fig. 8 to the open position of Fig. 7 to permit unimpeded indexing of the turret 20. For this purpose, and as clearly seen in Figs. 1, 2, and 4, a jaw-opening cam 114 is carried on the cam shaft 39 and coupled to the tool holders 64 and 66 to move same in the opposite directions to separate the tools 68 and 70. Cam 114 is coupled to the tool holders via a cam follower 116 which is rotatably supported on an upstanding operating lever 118, the latter being pivoted adjacent its lower free end on a horizontally extending stub shaft 120 fixed to the machine frame 29. The upper free end of the operating lever 118 is provided with camming projection 122 which periodically engages a follower 124 on the adjacent end of a rocker arm 126. The rocker arm 126, which is U-shaped in cross-section, is pivoted intermediate its ends on the head 56 by a pivot pin 128 and accommodates cam followers 130, 132 of the first and second tool holders 64, 66. Accordingly upon rocking movement of the centrally pivoted arm 126 under control of the jaw-opening cam 114, the tool holders 64 and 66 are moved in opposite directions against the bias of spring 78 to separate the tools 68 and 70.

Referring now to Figs. 1 and 6, the second work station 26, which is displaced 180 degrees from the first work station 24, will be seen to include a head 140, mounted on upstanding guide bars 142, 144 for vertical displacement relative to the turret 20 and holders 22. The vertically slidable head 140 supports first and second tool holders 146, 148, which are constructed, arranged and mounted on the head 140 as are the holders 64 and 66 on head 56. Holders 146 and 148 likewise carry lead working tools 150 and 152 which are movable away from each other in response to movement of the holders 146 and 148. The lead working tools 150 and 152, shown in greater detail in Figs. 11 and 12, include cooperating jaws 150a, 152a which are in end to end alignment and are cut away to provide an opening 154 when the jaws are in the closed position of Fig. 12. The opening 154 is arranged to receive the leads of group B, which are to be bunched, straightened, and stretched at the second work station 26. A suitable spring, not shown, is operatively connected to jaws 150a, 152a for biasing the jaws into the closed position of Fig. 12, wherein the opening 154 defines a path or axis along which the leads of group B are straightened when the head 140 is vertically displaced. Accordingly, upon upward displacement of the head 140, the leads of group B will be straightened and worked into a loose bunch extending generally in the same direction and along the path defined by opening 154.

In accordance with a further feature of the present invention, the head 140 is mounted for reciprocating movement normal to the direction or path of the vertical displacement. Simultaneous reciprocation and vertical displacement of the head 140 carries the leads to be worked back and forth causing them to assume a natural position thereby rendering the bunching, straightening, and stretching action more reliable, and assuring proper lead grouping. The head 140 and the tool holders 146 and 148 supported thereon, are mounted for horizontal reciprocation by the provision of a slidable carriage 154, see Fig. 6, mounted on vertically displaced horizontal guide bars 156 and 158.

In order to raise and lower the head 140 relative to the turret to effect bunching and straightening of the leads, a head elevating and lowering cam 160 is mounted on cam shaft 39. It is to be noted that the 180 degree displacement of the lead working stations relative to each other permits the utilization of the single cam shaft 39 as a common drive for the lead working mechanisms at the respective stations. To couple the head elevating and lowering cam 160 to the head 140, a bell crank operating lever 162 is pivoted on a pin 164 of the main frame for rocking movement parallel to a vertical plane. At one end of the bell crank lever there is pivoted a cam follower 166, which rides along the track of cam 160. The other end of the bell crank lever 162 is coupled to a substantially upright variable-length spring held together connecting rod 168 through a suitable universal joint 170. The upper end of the expansible connecting rod 168 is connected to the head 140 by a further universal joint 172. Accordingly, the head 140 can be raised and lowered relative to the turret 20 under control of the cam 160, without interference with the reciprocation of the head 140 in response to back and forth movement of the carriage 154.

Concurrent reciprocation of the head 140, while the latter is being vertically displaced, is accomplished by imparting a back and forth movement to the head-supporting carriage 154 under control of cam 174 on the cam shaft 39. The cam 174 is arranged contiguous to the carriage 154 which pivotally supports a cam follower 176 riding along the track of cam 174. The follower is held against the cam by spring means 177.

Figure 12:
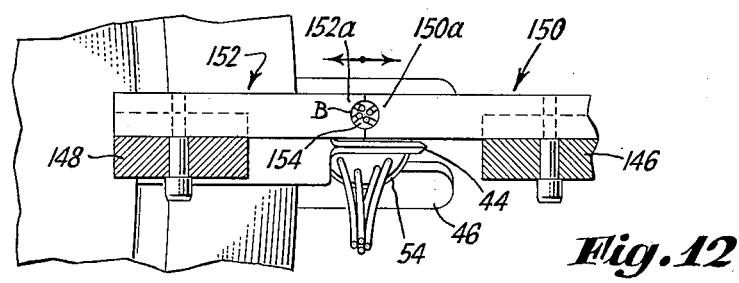
Fig. 12 is a fragmentary plan view similar to Fig. 11, showing the jaws of the second lead working station in the normally closed or work position.

Subsequent to the bunching and straightening of the leads of group B in response to simultaneous transverse and longitudinal displacement of the head 140, it is necessary to spread the lead working tools 150, 152 from the normally closed position of Fig. 12, to the open position of Fig. 11, to permit the unimpeded indexing of turret 20. For this purpose a jaw opening mechanism similar to the one described in connection with the lead working station 24 is provided which is operable under control of the cam 178, on cam shaft 39. Briefly, this mechanism includes an operating lever 180, pivoted adjacent its lower end on a stub shaft 182 and including a cam follower 183 engageable with the cam 178 and a camming projection 184 engageable with a follower 186 on the adjacent end of a rocker arm 188, the latter being coupled to the first and second tool holders 146 and 148 by the followers 190 and 192 in a manner similar to that disclosed with reference to followers 130 and 132.

The respective cams at the first and second lead working stations 24, 26 are constructed and displaced to provide the desired movement of the heads 56, 140 and their respective lead working tools in proper timed relation relative to each other and to the indexing of turret 20. Specifically, the cam 80 is arranged to reciprocate the head 56 through one or more cycles to bunch the leads of group A prior to tipping of the head 56 under control of cam 98 to displace the leads of group A to the desired angular position. Subsequent to proper orientation of the leads of group A relative to the leads of group B, the cam 114 becomes effective to open the tools 68 and 70 to permit indexing of the turret 20. At the second lead-working station 26, the desired sequential operation includes the opening of the tools 150 and 152 under control of cam 178 during indexing of the turret 20, and subsequent simultaneous vertical displacement and reciprocation of the head 140 under control of the cams 160, 176.

Briefly, the operation of the lead orienting and positioning machine of the present invention is as follows: The respective tool holders are manually loaded at stations in advance of the lead bunching and bending station 24. During the manual loading, the upper stop or parting wedge 44 engages the tube base 54b with the filament leads f1, f2 arranged on opposite sides thereof. It is to be noted that the remaining leads, as clearly seen in Figs. 7 and 8, do not interfere with the engagement of the wedge 44 against the tube base 54b since leads which may be in line with the wedge are dummy leads extending solely within the tube and do not extend beyond the tube base 54b. Upon loading of the respective holders 22, the intermittent indexing of the turret 20 brings the leads of group A, including the filament lead f2 into a work position relative to the tools 68 and 70 of the lead working station 24. Thereupon, the lead orienting and straightening mechanisms at this station are operated to bunch the leads of group A, as clearly seen in Fig. 10. The leads of group A are accordingly positioned at an angle of approximately 60 degrees relative to the remaining leads and are properly oriented and bunched for engagement with one of the track lighting contacts of the sealing machine.

Thereafter, the tools 68 and 70 are spread to the open position of Fig. 7, whereupon the tube 54 with the leads of group A, angularly positioned, is freed for further indexing into a work position relative to the second lead-working station 26. At the latter station, the tools 150 and 152 are opened as shown in Fig. 11 to receive the leads of group B including filament f1, the mechanism of this station being operable to close the tools to the position of Fig. 12 after indexing. Thereupon the tools 150 and 152 are concurrently reciprocated and vertically displaced to effect the bunching and straightening of the leads of group B to properly position same for engagement with the other track lighting contacts of the sealing machine. It is to be noted that the vertical displacement of the tools 150 and 152, to a certain extent stretches the leads while bunching and straightening same and will remove minor bends and kinks.

In accordance with the processing techniques of the present invention, the tube leads 54a are oriented preparatory to engagement with the track lighting contacts by bunching the leads of group A, including the filament or cathode f2 to provide a relatively compact bundle for connection to the contacts. The grouped leads are thereafter angularly positioned relative to the remaining leads, which are simultaneously bunched and straightened to provide the oriented group B. This latter group includes the cathode or filament f1, and provides a further relatively compact bundle for connection to the other of the track-lighting contacts.

From the foregoing, it is seen that the automatic mechanisms and process of the present invention advantageously employs the principal of working fragile wires, such as the tube leads of miniatures and sub-miniatures, to obtain a desired orientation of these wires, to group and bunch the wires, and to remove kinks, bends and the like from the respective wires. Further, this wire-working technique and the mechanisms are particularly adaptable to prepare leads of a vacuum tube for processing to render their cathode coating emissive.

While in accordance with the provision of the statutes, I have illustrated and described the best form of embodiment of my invention now known to me, it will be apparent to those skilled in the art that changes may be made in the apparatus and process disclosed without departing from the spirit of my invention as set forth in the appended claims and that in some cases certain features of my invention may be used to advantage without a corresponding use of other features.

What is claimed is:

1. A machine for grouping and orienting leads of electrical devices comprising a feed carrier and means to move the same said carrier including a plurality of holders adapted to receive said electrical devices for movement along a feed path, a lead bending mechanism arranged along said feed path and adapted to bend one group of leads into an angular position relative to the other leads, said lead bending mechanism including a head mounted for reciprocating movement along and for rocking movement about an axis, jaws on said head adapted to engage said one group of leads for bunching said one group in response to said reciprocating movement and for angularly positioning said one group in response to said rocking movement, means operatively connected to said head for sequentially reciprocating and rocking said head to thereby effect bunching and positioning of said one group of leads, and a lead straightening mechanism arranged along said feed path and adapted to straighten other leads, said lead straightening mechanism including a second head mounted for sliding movement along and for reciprocating movement normal to an axis, other jaws on said second head adapted to be engaged about said other leads, said other leads being bunched in response to said reciprocating movement and straightened in response to said sliding movement, and means operatively connected to said second head for concurrently sliding and reciprocating it to thereby effect bundling and straightening of said other leads.

2. A machine for grouping and orienting leads of electrical devices comprising a feed carrier and means to move the same, said carrier including a plurality of holders adapted to receive said electrical devices for movement along a feed path, a lead parting wedge forming a part of each of said holders adapted to separate the leads of the respective devices into two groups, a lead bending mechanism arranged along said feed path and adapted to bend one group of leads into an angular position relative to the other leads, said lead bending mechanism including a head mounted for reciprocating movement along and for rocking movement about an axis, jaws on said head adapted to engage said one group of leads for bunching said one group in response to said reciprocating movement and for angularly positioning said one group in response to said rocking movement, means operatively connected to said head for sequentially reciprocating and rocking said head to thereby effect bunching and positioning of said one group of leads, and a lead straightening mechanism arranged along said feed path and adapted to straighten other leads, said lead straightening mechanism including a second head mounted for sliding movement along and for reciprocating movement normal to an axis, other jaws on said second head adapted to be engaged about said other leads, said other leads being bunched in response to said reciprocating movement and straightened in response to said sliding movement, and means operatively connected to said second head for concurrently sliding and reciprocating it to thereby effect bundling and straightening of said other leads.

3. A machine for grouping and orienting leads depending from electrical devices comprising a feed carrier and means to move the same, said carrier including a plurality of holders adapted to support said electrical devices in inverted positions for movement along a feed path, a lead parting wedge forming a part of each of said holders adapted to separate the leads of the respective devices into two groups, a lead bending mechanism arranged along said feed path and adapted to bend one group of leads into an angular position relative to the other leads, said lead bending mechanism including a head mounted for reciprocating movement along an axis and for rocking movement about said axis to an inclined position, jaws on said head defining a recess opening in the direction of rocking movement and adapted to be engaged about said one group of leads, said jaws bunching said one group in response to said reciprocating movement and angularly positioning said one group in response to said rocking movement, and means operatively connected to said head for reciprocating and rocking said head to thereby effect bunching and positioning of said one group of leads; and a lead straightening mechanism arranged along said feed path and adapted to straighten said other leads, said lead straightening mechanism including a second head mounted for sliding movement along a vertical axis to an elevated position and for reciprocating movement normal to said axis, other jaws on said head defining a lead-receiving opening adapted to be engaged about said other leads, said other jaws bunching said other leads in response to said reciprocating movement and straightening them in response to sliding movement into said elevated position, and means operatively connected to said second head for sliding and reciprocating it to thereby effect bunching and straightening of said other leads.

4. A machine for grouping and orienting leads of an electrical device comprising a rotatable feed carrier movable in one direction and including a holder adapted to support said electrical device for movement along a circular path, a lead parting wedge forming a part of said holder adapted to separate the leads of the device into two groups, drive means for indexing said carrier in said one direction, a lead bending mechanism adjacent the carrier adapted to bend one group of leads into an angular position relative to the other leads, said lead bending station including a head mounted for pivotal movement into an inclined position, movable jaws on said head normally closed and adapted to be engaged about said one group of leads for angularly positioning said one group in response to pivotal movement of said head into said inclined position, means operatively connected to said head for pivoting said head to effect positioning of said one group of leads, and means operatively connected to said jaws for opening said jaws in timed relation to indexing of said carrier; and a leading straightening mechanism adapted to straighten other leads, said lead straightening station including a head mounted for movement to an elevated position, jaws on said head normally closed and adapted to be engaged about said other leads for straightening them in response to said movement, means operatively connected to said head for moving said head to said elevated position to effect straightening of said other leads, and means operatively connected to said jaws for opening said jaws in timed relation to indexing of said carrier.

5. In a machine for orienting leads of an electrical device, a feed carrier and means to move the same, said carrier including a holder adapted to receive said electrical device for movement along a feed path, a lead parting wedge forming a part of said holder adapted to separate the leads of said electrical device into two groups, and a lead bending mechanism including a head mounted for pivotal movement into an inclined position, jaws on said head adapted to be engaged about said one group of leads for angularly positioning said one group in response to said pivotal movement, and means operatively connected to said head for pivoting said head to thereby effect angular positioning of said one group of leads.

6. In a machine for grouping and orienting leads extending from electrical devices, a feed carrier and means to move the same, said carrier including a plurality of holders adapted to support said electrical devices in inverted positions, with leads up, for movement along a feed path, a lead parting wedge forming a part of each of said holders and adapted to separate the leads of the respective devices into two groups, and a lead bending mechanism arranged along said feed path and adapted to bend one group of leads into an angular position relative to the other group of leads, said lead bending mechanism including a head mounted for reciprocating movement along an axis and for rocking movement about said axis to an inclined position, jaws on said head defining a recess opening in the direction of rocking movement and adapted to be engaged about said one group of leads, said jaws bunching said one group of leads in response to said reciprocating movement and angularly positioning said one group in response to said rocking movement, and means operatively connected to said head for sequentially reciprocating and rocking said head to thereby effect bunching and positioning of said one group of leads.

7. In a machine for grouping and orienting leads of electrical devices, a rotatable turret including a plurality of peripherally spaced holders adapted to support said electrical devices in inverted positions with leads up for movement along a circular feed path, means to rotate the turret, a lead parting wedge forming a part of each of said holders and adapted to separate the leads of the respective devices into two groups, and a lead bending mechanism arranged along said feed path and adapted to bend one group of leads into an angular position relative to the other group of leads, said lead bending mechanism including a head mounted for reciprocation along a horizontal axis extending radially of said turret, said head being further mounted for pivotal movement in one direction about said horizontal axis to an inclined position, jaws on said head defining a lead receiving pocket opening in said one direction to receive said one group of leads for bunching said one group in response to said reciprocatory movement and for angularly positioning said one group in response to said pivotal movement, and means operatively connected to said head for sequentially effecting reciprocatory and pivotal movement of said head to thereby bunch said one group of leads and to displace the bunched group to said angular position.

8. In a machine for orienting leads of an electrical device, a rotatable feed turret including a holder adapted to receive the electrical device for movement along a circular feed path, a lead parting wedge forming a part of said holder adapted to separate the leads of the device into two groups, drive means for indexing said feed turret and a lead bending mechanism adapted to bend one group of leads into an angular position relative to the other group of leads, said lead bending mechanism including a head mounted for pivotal movement to an inclined position, movable jaws on said head normally closed and defining a pocket along said feed path adapted to receive said one group of leads for angularly positioning said one group in response to said pivotal movement of said head, means operatively connected to said head for pivoting said head into said inclined position to thereby effect positioning of said one group of leads, and means operatively connected to said jaws for opening said jaws in timed relation to indexing of said feed turret and pivoting of said head to permit unimpeded removal of the oriented leads from said lead bending mechanism.

9. In a machine for grouping and orienting leads of electrical devices, a feed carrier and means to move the same, said carrier including a plurality of holders adapted to receive said electrical devices for movement along a feed path, a lead parting wedge forming a part of each of said holders adapted to separate the leads of the respective devices into two groups, and a lead straightening mechanism arranged along said feed path and adapted to straighten a group of said leads, said lead straightening mechanism including a head mounted for reciprocating movement normal to an axis and for sliding movement along said axis, jaws on said head adapted to be engaged about said group of leads, said jaws bunching said group of leads in response to said reciprocating movement and straightening said group in response to said sliding movement, and means operatively connected to said head for concurrently reciprocating and sliding said head to thereby effect bunching and straightening of said group of leads.

10. In a machine for orienting leads of an electrical device, a feed carrier and means to move the same, said carrier including holders adapted to receive said electrical device for movement along a feed path, a lead parting wedge forming a part of said holder adapted to separate the leads of said device into two groups, and a lead straightening mechanism arranged along asid feed path and adapted to straighten a group of said leads, said lead straightening mechanism including a head mounted for movement along an axis extending parallel to the direction of the group of leads when straightened, jaws on said head adapted to be engaged about said group of leads for straightening said group in response to movement of said head, and means operatively connected to said head for moving said head along said axis to thereby straighten said group of leads.

11. In a machine for grouping and orienting leads of an electrical device, a feed carrier and means to move the same, said carrier including a holder adapted to receive said electrical device for movement along a feed path, a lead parting wedge forming a part of said holder adapted to separate the leads of said device into two groups, and a lead straightening mechanism arranged along said feed path and adapted to straighten a group of said leads, said lead straightening mechanism including a head mounted for movement along an axis and for reciprocating movement normal to said axis, jaws on said head adapted to be engaged about said group of leads, said jaws bunching said group of leads in response to said reciprocating movement and straightening said group in response to movement along said axis, and means operatively connected to said head for simultaneously moving and reciprocating said head to thereby effect bunching and straightening of said group of leads.

12. In a machine for grouping and orienting leads of electrical devices, a rotatable turret and means to rotate same, said turret including a plurality of peripherally spaced holders adapted to support said electrical devices in inverted positions with leads up for movement along a circular feed path, a lead parting wedge forming a part of each of said holders and adapted to separate the leads of the respective devices into two groups, and a lead straightening mechanism arranged along said feed path and adapted to straighten a group of said leads, said lead straightening mechanism including a head mounted for sliding movement along a vertical axis to an elevated position and for reciprocating movement normal to said axis, jaws on said head defining a lead-receiving opening adapted to be engaged about said group of leads, said jaws bunching said group of leads in response to said reciprocating movement and straightening said group in response to sliding movement into said elevated position, and means operatively connected to said head for sliding and reciprocating said head to thereby effect bunching and straightening of said group of leads.

13. In a machine for grouping and orienting leads of an electrical device, feed carrier including a holder adapted to receive the electrical device for movement along a feed path, a lead parting wedge forming a part of said holder adapted to separate the leads of said device into two groups, drive means for intermittently moving said carrier, and a lead straightening mechanism adapted to straighten a group of said leads, said lead straightening mechanism including a head mounted for sliding movement along an axis and for reciprocating movement normal to said axis, jaws on said head normally closed and defining an opening along said feed path adapted to receive said group of leads, said jaw bunching said group of leads in response to said reciprocating movement and straightening said group in response to said sliding movement, means operatively connected to said head for sliding and reciprocating said head to effect bunching and straightening of said group of leads, and means operatively connected to said jaws for opening said jaws in timed relation to the intermittent movement of said feed carrier to permit unimpeded removal of the straightened leads from said lead straightening mechanism.

14. A lead-wire positioning machine comprising a holder for supporting an electrical device having lead wires projecting therefrom and separated into at least two groups, a head movable relative to the holder including jaws engageable about one group of lead wires, means for mounting said head for reciprocating movement along an axis and for rocking movement about said axis, an operating mechanism for sequentially reciprocating and rocking said head whereby said jaws bunch said one group of lead wires and thereafter bend said one group to an angular position relative to said other group, a further head including further jaws engageable about said other group of lead wires, means for mounting said further head for displacement along an axis and for reciprocating movement normal to said axis, and a further operating mechanism for concurrently displacing and reciprocating said further head whereby said further jaws bunch and straighten said other groups of lead wires.

15. A machine for orienting leads of an electron tube having a bulb and a base from which wires extend in somewhat parallel relationship, said machine comprising an indexible carrier, means to index the carrier, said carrier including a holder having a seat to support the bulb with the base uppermost and a bar fixedly mounted on the holder and extending across the seat substantially centrally of the seat, to separate the wires into two groups of leads, a lead bending mechanism including a rockably mounted head on one side of the bar in an indexed position of the carrier, arranged to bend one group of leads into an angular position relative to the other group of leads, actuating means operatively connected to said head for rocking the latter through a predetermined arc, a lead straightening mechanism including a slidably mounted head on the opposite side of the bar in another position of the carrier arranged to straighten the other group of leads, and actuating means operatively connected to said last named head for sliding the latter along a linear path.

16. A lead wire bending mechanism comprising a holder having a seat for supporting an electrical device having lead wires extending upwardly therefrom, a member fixedly mounted atop the holder extending across the seat substantially centrally thereof for separating the lead wires into two groups, a head movable relative to the holder including jaws engageable about one group of lead wires on one side of the member, means for rocking said head relative to said holder whereby said jaws bend said one group of lead wires to an angular position relative to the other group of wires, a further head including further jaws engageable about said other group of wires on the other side of the member, and means for displacing said further head in a direction along the length of the second group of wires, whereby said further jaws straighten said other group of wires.

References Cited in the file of this patent

UNITED STATES PATENTS

| | | |
|---|---|---|
| 1,646,258 | Raus | Oct. 18, 1927 |
| 1,821,894 | Otaka | Sept. 1, 1931 |
| 1,853,947 | Van Der Poel | Apr. 12, 1932 |
| 2,120,877 | Uber | June 14, 1938 |
| 2,297,950 | Flaws | Oct. 6, 1942 |
| 2,632,482 | Lincoln | Mar. 24, 1953 |
| 2,640,509 | Kulberg | June 2, 1953 |
| 2,650,634 | Young | Sept. 1, 1953 |
| 2,661,029 | Walsh | Dec. 1, 1953 |
| 2,696,849 | Flaws | Dec. 14, 1954 |
| 2,711,760 | Meckstroth et al. | June 28, 1955 |
| 2,721,584 | Midgley | Oct. 25, 1955 |
| 2,760,529 | Pakish et al. | Aug. 28, 1956 |
| 2,765,002 | Reynolds | Oct. 2, 1956 |
| 2,777,476 | Fante et al. | Jan. 15, 1957 |
| 2,798,514 | Mullan | July 9, 1957 |